US011211759B2

(12) United States Patent
Zhu (10) Patent No.: US 11,211,759 B2
(45) Date of Patent: *Dec. 28, 2021

(54) TOOL FOR CONNECTING BUSBARS DRIVEN BY A PNEUMATIC CYLINDER DRIVING UNIT

(71) Applicant: Gong Zhu, Xiamen (CN)

(72) Inventor: Gong Zhu, Xiamen (CN)

( * ) Notice: Subject to any disclaimer, the term of this patent is extended or adjusted under 35 U.S.C. 154(b) by 170 days.

This patent is subject to a terminal disclaimer.

(21) Appl. No.: 16/742,823

(22) Filed: Jan. 14, 2020

(65) Prior Publication Data

US 2020/0153188 A1 May 14, 2020

Related U.S. Application Data

(63) Continuation of application No. 15/919,241, filed on Mar. 13, 2018, now Pat. No. 10,587,086.

(30) Foreign Application Priority Data

Apr. 10, 2017 (CN) .......................... 201710230067.8

(51) Int. Cl.
| | |
|---|---|
| *H01R 43/027* | (2006.01) |
| *H01R 43/20* | (2006.01) |
| *H01R 43/26* | (2006.01) |
| *H01R 4/28* | (2006.01) |
| *H01R 43/00* | (2006.01) |
| *H01R 4/10* | (2006.01) |
| *H01R 25/14* | (2006.01) |
| *H02G 5/00* | (2006.01) |

(52) U.S. Cl.
CPC ............. *H01R 43/027* (2013.01); *H01R 4/28* (2013.01); *H01R 43/00* (2013.01); *H01R 43/20* (2013.01); *H01R 43/26* (2013.01); *H01R 4/10* (2013.01); *H01R 25/145* (2013.01); *H02G 5/00* (2013.01)

(58) Field of Classification Search
CPC .... H01R 25/145; H01R 43/027; H01R 43/20; H01R 43/26; H01R 4/10; H02G 5/00
See application file for complete search history.

(56) References Cited

U.S. PATENT DOCUMENTS

| | | | | |
|---|---|---|---|---|
| 10,396,536 B2 * | 8/2019 | Zhu | ...................... | H01R 25/162 |
| 10,587,086 B2 * | 3/2020 | Zhu | ...................... | H01R 43/027 |
| 10,622,797 B2 * | 4/2020 | Zhu | .......................... | H01R 4/40 |
| 10,770,880 B2 * | 9/2020 | Zhu | ........................ | H02G 5/002 |
| 10,971,913 B2 * | 4/2021 | Zhu | ...................... | H01R 25/162 |
| 2020/0153188 A1 * | 5/2020 | Zhu | ...................... | H01R 43/027 |

* cited by examiner

*Primary Examiner* — Minh N Trinh (57) ABSTRACT

A tool has a pneumatic cylinder driving unit, a stationary portion, a movable portion, a loading portion, a first heating portion, and a second heating portion. The movable portion is movably connected to a first and second stationary shaft of the stationary portion, the movable portion is fixedly connected to the pneumatic cylinder driving unit by a movable shaft, the movable shaft is driven to slide axially with respect to the first and second stationary shaft by the pneumatic cylinder driving unit, the loading portion is movably connected to the second stationary shaft of the stationary portion and slides between a stationary portion body and a movable portion body, the loading portion rotates around the second stationary shaft.

4 Claims, 13 Drawing Sheets

TOOL FOR CONNECTING BUSBARS DRIVEN BY A PNEUMATIC CYLINDER DRIVING UNIT

CROSS-REFERENCE TO RELATED APPLICATIONS

This application is a continuation of U.S. patent application Ser. No. 15/919,241, filed Aug. 13, 2018, now U.S. Pat. No. 10,587,086, which claimed priority to China Patent Application No. 201710230067.8, filed Apr. 10, 2017, the disclosures of which are hereby incorporated herein by reference in their entireties.

BACKGROUND OF THE INVENTION

The invention relates to an electric device, especially to a tool for connecting busbars.

Figure 21:
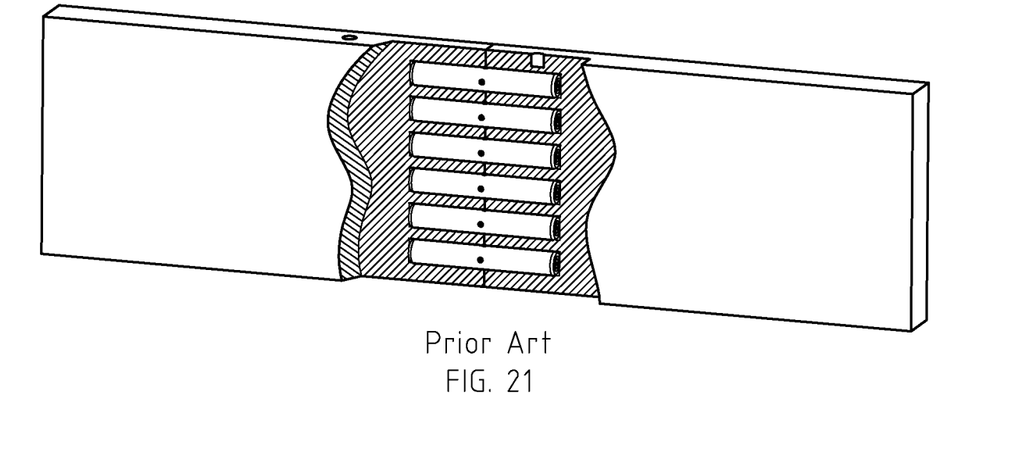
FIG. 21 is a sectional 3d-drawing of busbars after connecting.

In a field of power distribution, partly overlapping two busbars is usually used to be a manner of a connection between two busbars, then using bolts and nuts to fasten them. As this manner required, there is a certain length of two busbars needed to overlap for keeping a current density of a touching surface within a normal range of values so as to make the connecting part meet requirements of related standards. In order to keep a low temperature rising of an electric device, usually a length of overlapping is increased for increasing a touching surface so as to reduce a current density thereof. However, increasing the length of overlapping may increase amounts of busbars resulted in increasing cost. Electric clearance or phase distance between busbars may be reduced as a result of bolts used for fastening, in order not to reduce the electric clearance or phase distance, a distance between busbars needs to be increased, however increasing the distance necessarily enlarge an occupation space of busbars. How to increase a touching surface for reducing a temperature rising not resulted in reducing electric clearance or phase distance or enlarging occupation space of busbars, there is a new manner of connecting busbars to solve the above problem, busbars are connected in a form of butt-and-butt connecting via connecting rods, see FIG. 21.

BRIEF SUMMARY OF THE INVENTION

The object of the invention is to provide a tool used to mount connecting rods to busbars for connecting busbars in a form of butt-and-butt connecting.

Such object is achieved by providing a tool for connecting busbars as defined in claim 1. Further advantageous according to the invention will be apparent from the dependent claims.

The invention provides a tool for connecting busbars, said tool comprises an hydraulic cylinder driving unit and an electric control unit connected with an electrical power input. Said tool further comprises a stationary portion removably connected to a busbar, a movable portion removably connected to a busbar, and a loading portion for clamping connecting rods. Said movable portion is movably connected to a first and second stationary shaft of said stationary portion, said movable portion is fixedly connected to said hydraulic cylinder driving unit of said stationary portion by a movable shaft, said movable shaft is driven to slide axially with respect to said first and second stationary shaft by said hydraulic cylinder driving unit, said loading portion is movably connected to said second stationary shaft of said stationary portion and slides between a stationary portion body and a movable portion body, said loading portion rotates around said second stationary shaft.

Said stationary portion comprises said first stationary shaft, said second stationary shaft parallel to said first stationary shaft, said movable shaft parallel to said first stationary shaft, a first stationary plate perpendicular to and fixedly connected to said first and second stationary shaft, a second stationary plate perpendicular to and fixedly connected to said first and second stationary shaft, said hydraulic cylinder driving unit arranged between said first and second stationary plate, a third stationary plate perpendicular to and fixedly connected to said first and second stationary shaft, a fourth stationary plate perpendicular to and fixedly connected to said first and second stationary plate, and a first positioning pillar arranged to said fourth stationary plate for inserting into a positioning hole of a busbar of said busbars. Said movable shaft is fixedly connected to a piston rod of said hydraulic cylinder driving unit, said piston rod drives said movable shaft to move between said first stationary plate and said third stationary plate. Said movable portion comprises a seventh stationary plate, a fifth stationary plate perpendicular to and fixedly connected to said seventh stationary plate, a sixth stationary plate perpendicular to and fixedly connected to said seventh stationary plate, a second positioning pillar arranged to said seventh stationary plate for inserting into a positioning hole of a busbar of said busbars, a clamping portion for clamping a busbar of said busbars arranged between said fifth and sixth stationary plate and through said seventh stationary plate, an electric motor driving unit arranged to said seventh stationary plate for driving said clamping portion to move, and a limiting portion arranged to said seventh stationary plate for limiting said clamping portion to move. Said loading portion comprises two movable plates which respectively open or close with respect to an axis of said second stationary shaft, said movable plate comprises a receiving cavity for receiving connecting rods. Said first and second stationary shaft of said stationary portion penetrate through said movable portion, an end of said movable shaft of said stationary portion is fixedly connected to said fifth stationary plate of said movable portion, said movable portion slides between said third and first stationary plate of said stationary portion, said second stationary shaft of said stationary portion penetrates through said loading portion, which slides between said fifth stationary plate of said movable portion and said first stationary plate of said stationary portion and rotates around said second stationary shaft, said fifth stationary plate is parallel to said sixth stationary plate.

Said stationary portion further comprises a first heating portion arranged to said fourth stationary plate for heating a busbar of said busbars, said first heating portion movably connects to said fourth stationary plate to adjust a distance between said first heating portion and a busbar of said busbars. Said movable portion further comprises a second heating portion arranged to said seventh stationary plate for heating a busbar of said busbars, said second heating portion movably connects to said seventh stationary plate to adjust a distance between said second heating portion and a busbar of said busbars.

Said stationary portion further comprises a supporting portion for supporting a loading portion, a supporting end of said supporting portion penetrates through a first stationary plate, a length of said supporting end protruding from said first stationary plate is adjusted by a sliding block of said supporting portion.

Said limiting portion comprises a base, a straight pin which has an interference fit with said base, a limiting end for partly inserting into said base, a spring for replacing said limiting end, and an electromagnet for matching with a core rod of said limiting end. Said electromagnet is fastened to said base by screws, said limiting end comprises a tooth meshing with a teeth groove of said clamping portion, said tooth comprises a recess matching with said straight pin, said electromagnet attracts said core rod of said limiting end not to mesh with said teeth groove of said clamping portion, said spring acts on said tooth to make said tooth mesh with said teeth groove.

Said first stationary shaft is fixedly connected to said first stationary plate by a straight pin, said second stationary shaft is fixedly connected to said first stationary plate by a straight pin, said first stationary shaft is fixedly connected to said second stationary plate by a straight pin, said second stationary shaft is fixedly connected to said second stationary plate by a straight pin.

Said first stationary shaft is fixedly connected to said third stationary plate by a straight pin, said second stationary shaft is fixedly connected to said third stationary plate by a straight pin.

An end of said movable shaft of said stationary portion is fixedly connected to said fifth stationary plate of said movable portion by a nut.

The invention also provides a tool used for connecting busbars, said tool comprises a pneumatic cylinder driving unit and an electric control unit connected with an electrical power input. Said tool further comprises a stationary portion removably connected to a busbar of said busbars, a movable portion removably connected to a busbar of said busbars, and a loading portion for clamping connecting rods. Said movable portion is movably connected to a first and second stationary shaft of said stationary portion, said movable portion is fixedly connected to said pneumatic cylinder driving unit of said stationary portion by a movable shaft, said movable shaft is driven to slide axially with respect to said first and second stationary shaft by said pneumatic cylinder driving unit, said loading portion is movably connected to said second stationary shaft of said stationary portion and slides between a stationary portion body and a movable portion body, said loading portion rotates around said second stationary shaft.

Advantageous Effects (1) It is achieved that a plurality of connecting rods are simultaneously mounted to busbars and that two busbars are connected in a form of butt-and-butt connecting.

(2) A movable portion comprises a clamping portion and a second positioning pillar, while a stationary portion comprises a first positioning pillar, such arrangement benefits that a second busbar is capable to adjust its position before connecting till said second busbar, connecting rods, and a first busbar are totally aligned with one another. Each product needs to adjust its position according to site condition when they are in an assemble process, because accuracy in busbar assemble site is not very high. Said second busbar and said connecting tool can be seen as one whole part because of a movable portion clamping said second busbar, this whole part can rotate around an axis of a first positioning pillar, also can move along an axis of said first positioning pillar, said second busbar can slide along a stationary shaft of a stationary portion when it is clamped by a movable portion. Therefore, said second busbar is capable to adjust its position before connecting till said second busbar, connecting rods and said first busbar are totally aligned with one another, such arrangement improves tool adaptability to working condition.

(3) Each of a movable portion and a stationary portion comprises a handle, which comprises buttons having the same functions, only when two hands all hold handles and simultaneously active relative buttons, relative functions of tool can work, such arrangement avoids harm to safety when connecting busbars.

(4) A supporting end is telescopic to solve a storage problem after a loading portion finishing mounting connecting rods, two movable plates are supported by a supporting end to make a loading portion get out of busbars connecting path so as to avoid busbars sticking a loading portion when connecting busbars, it is good to connect busbars.

(5) Open-or-close loading portion is slidable along a second stationary shaft and also rotatable around said second stationary shaft, such arrangement is convenient for loading connecting rods.

(6) Using heating portion to heat busbars in a manner of high frequency electromagnetic radiation, it is an homogeneous heating to improve heating efficiency, there is no open fire at site, hidden danger is removed to improve working conditions.

(7) There is an adjustment arranged to a heating portion, so heating portion is capable to heat different thickness of busbar, such arrangement improves tool's adaptability to different kinds of busbars.

BRIEF DESCRIPTION OF THE SEVERAL VIEWS OF THE DRAWINGS

Further characteristics and advantages of the invention will emerge from the description of preferred, but not exclusive embodiments of the tool according to the invention, non-limiting examples of which are provided in the attached drawings, in which.

List of Reference Characters 1. stationary portion;
2. movable portion;
3. loading portion;
14. first stationary plate;
15. hydraulic cylinder driving unit;
16. second stationary plate;
17. first heating portion;
18. supporting portion;
19. third stationary plate;
110. fourth stationary plate;
111. first positioning pillar;
22. fifth stationary plate;
23. sleeve;
24. limiting portion;
25. second positioning pillar;
11. first stationary shaft;
12. second stationary shaft;
13. movable shaft;
26. second heating portion;
27. clamping portion;
28. seventh stationary plate;
29. sixth stationary plate;
41. electromagnet;
42. spring;
43. core rod;
44. tooth;
45. straight pin;
46. limiting end;
47. base;
48. recess;
5. air input.

DETAILED DESCRIPTION OF THE INVENTION

At site of connecting busbars, when it is needed to connect two busbars, one of said two busbars is already fixedly mounted, the other one is movable, the movable one is taken to connect to the fixedly mounted one. The fixedly mounted busbar is defined as a first busbar while the movable busbar is defined as a second busbar in the invention. It is needed to preprocess busbars before connecting process, a pre-hole is arranged to a surface which is for connecting so as to receive a connecting rod, a depth of pre-hole is slightly greater than half of connecting rod, a positioning hole is arranged to a surface which faces a tool so as to match with a positioning pillar of tool, a diameter of positioning hole is slightly greater than a diameter of positioning pillar to have a clearance fit between them.

Embodiment 1

Figure 1:
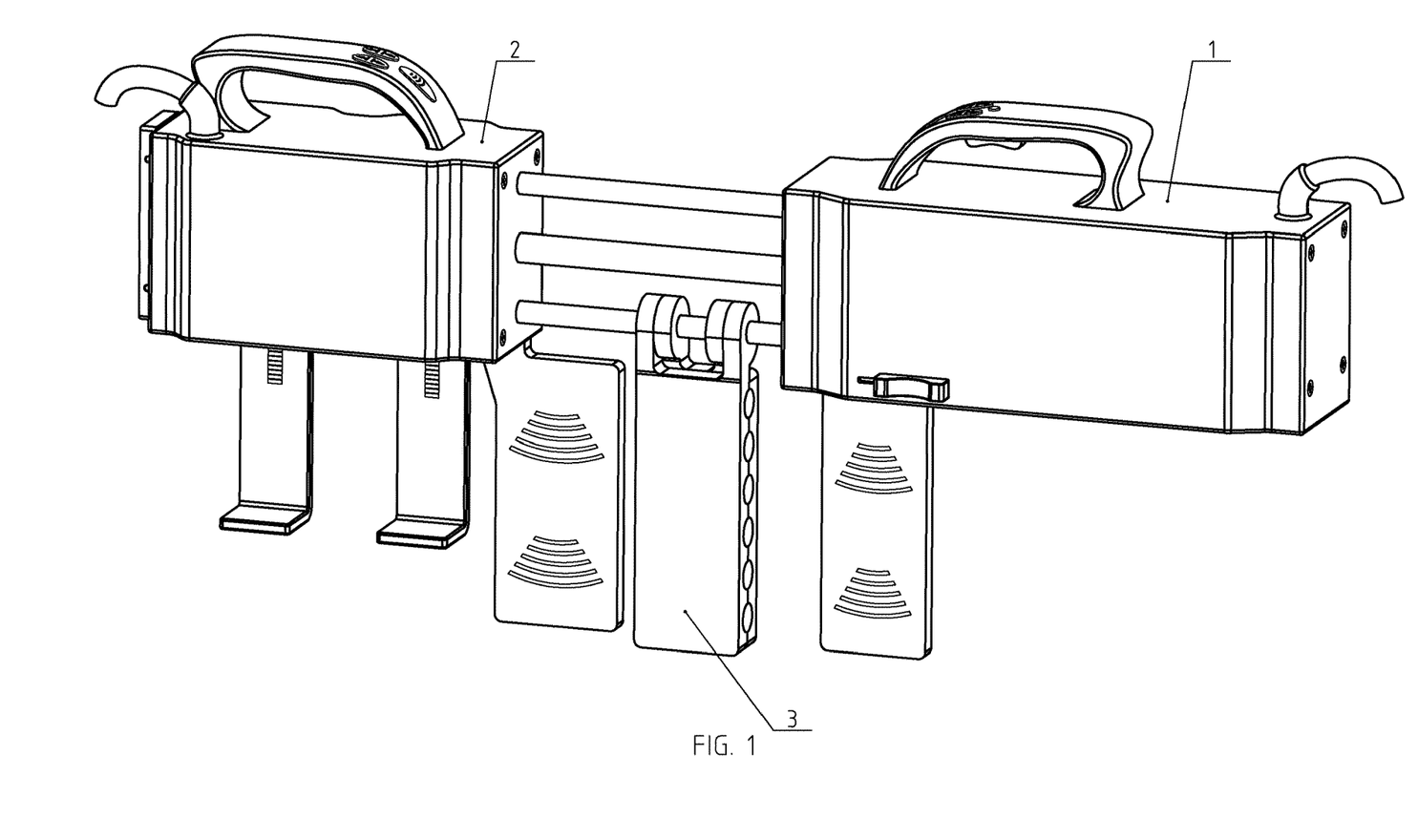
FIG. 1 is a 3d-drawing of a tool used for connecting busbars of embodiment 1, wherein a movable portion is at a first position, a loading portion is closed.
Figure 2:
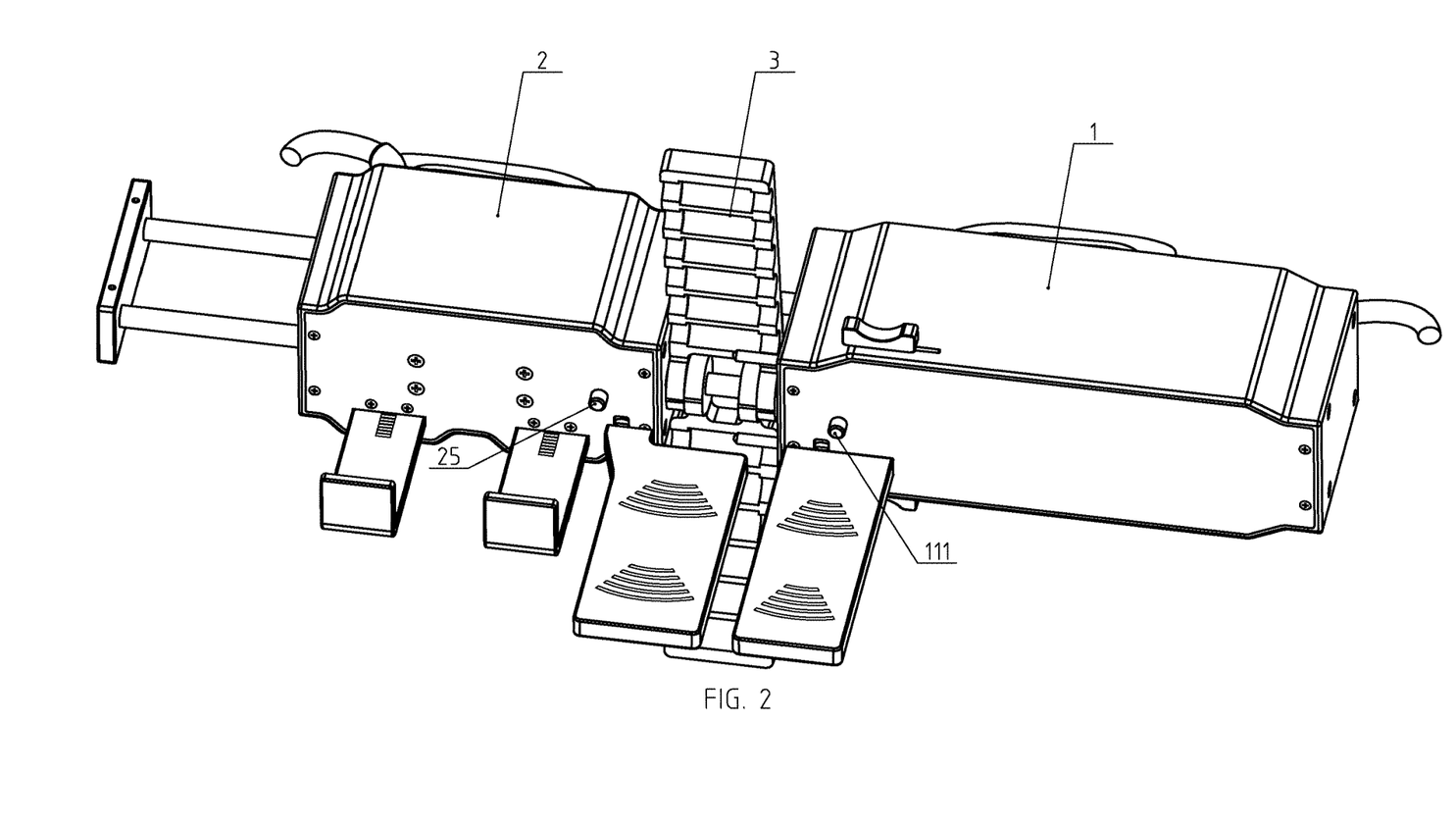
FIG. 2 is a 3d-drawing of FIG. 1 from another view, wherein a movable portion is at a second position, a loading portion is open.

Referring to FIG. 1 and FIG. 2, a tool used for connecting busbars comprises a stationary portion 1 removably connected to a first busbar, a movable portion 2 removably connected to a second busbar and a loading portion 3 for clamping connecting rods. Said movable portion 2 is movably connected to a first and second stationary shaft 11,12 of said stationary portion 1, said movable portion 2 is fixedly connected to said hydraulic cylinder driving unit 15 of said stationary portion 1 by a movable shaft 13, said movable shaft 13 is driven to slide axially with respect to said first and second stationary shaft 11,12 by said hydraulic cylinder driving unit 15, said loading portion 3 is movably connected to said second stationary shaft 12 of said stationary portion 1 and slides between a stationary portion body and a movable portion body. Each of said stationary and movable portion 1,2 comprises a shell with a handle, said handle comprises a plurality of buttons connected to an electric control unit, an electrical power input is connected to said electric control unit. Each of two sides of said stationary portion 1 comprises a sliding block, pushing said sliding block is to make a supporting end of a supporting portion 18 protrude from or retract into said stationary portion 1. When said supporting end is at a protruding status, said supporting end supports two movable plates of said loading portion 3 which are at an open status to keep said supporting portion 3 at an open status is to avoid negative influence on busbars connecting. A first positioning pillar 111 is arranged to a surface of said stationary portion 1 which is to match with said first busbar, said first positioning pillar 111 matches with a positioning hole preprocessed to said first busbar so that there is no relative displacement between said stationary portion 1 and said first busbar with respect to a length direction of said first busbar when connecting busbars, that is to say that said stationary portion 1 and said first busbar are relatively static when connecting blusbars. Said first positioning pillar 111 withdraws from said positioning hole of said first busbar after busbars connecting, it is achieved that said stationary portion 1 is removably connected to said first busbar. A first heating portion 17 is perpendicularly arranged to a fitting side between said first busbar and said stationary portion 1, a heating surface of said first heating portion 17 faces said first busbar. Said first heating portion 17 heats said first busbar under control of said electric control unit after activating a heating button of said handle. Said first busbar with good electrical conductivity is in a high frequency alternative magnetic field created by a coils arranged in said first heating portion 17, said first busbar heats up because of eddy effect. A second positioning pillar 25 is arranged to a surface of said movable portion 2 which is to match with said second busbar, said second positioning pillar 25 matches with a positioning hole preprocessed to said second busbar so that there is no relative displacement between said movable portion 2 and said second busbar with respect to a length direction of said second busbar when connecting busbars, that is to say that said movable portion 2 and said second busbar are relatively static when connecting blusbars. A second heating portion 26 is perpendicularly arranged to a fitting side between said second busbar and said movable portion 2, a heating surface of said second heating portion 26 faces said second busbar. Said second heating portion 26 heats said second busbar under control of said electric control unit after activating a heating button of said handle. Said second busbar with good electrical conductivity is in a high frequency alternative magnetic field created by a coils arranged in said second heating portion 26, said second busbar heats up because of eddy effect. A clamping portion 27 is perpendicularly arranged to a fitting side between said movable portion 2 and said second busbar, said clamping portion 27 comprises a teeth groove. An electric motor driving unit arranged in said movable portion 2 works after activating a clamping button of a handle, a function of said clamping portion 27 to clamp said second busbar is achieved by a meshing between gears and said teeth groove so as to ensure that said second busbar does not secede from said movable portion 2 in a connecting process, said movable portion 2 clamps said second busbar to move to said first busbar which is already fixedly mounted. An electric motor driving unit arranged in said movable portion 2 works after activating a releasing button of a handle, a function of said clamping portion 27 to release said second busbar is achieved by a meshing between gears and said teeth groove, it is achieved that said movable portion 2 is removably connected to a busbar. There is an adjustment arranged to each said first and second heating portion 17,26 to be adaptable to different thickness of busbars, high frequency alternative magnetic heating is arranged to heating portion to heat busbar quickly without open fire, it is an homogeneous heating to improve heating efficiency, there is no open fire at site, hidden danger is removed to improve working conditions.

Figure 4:
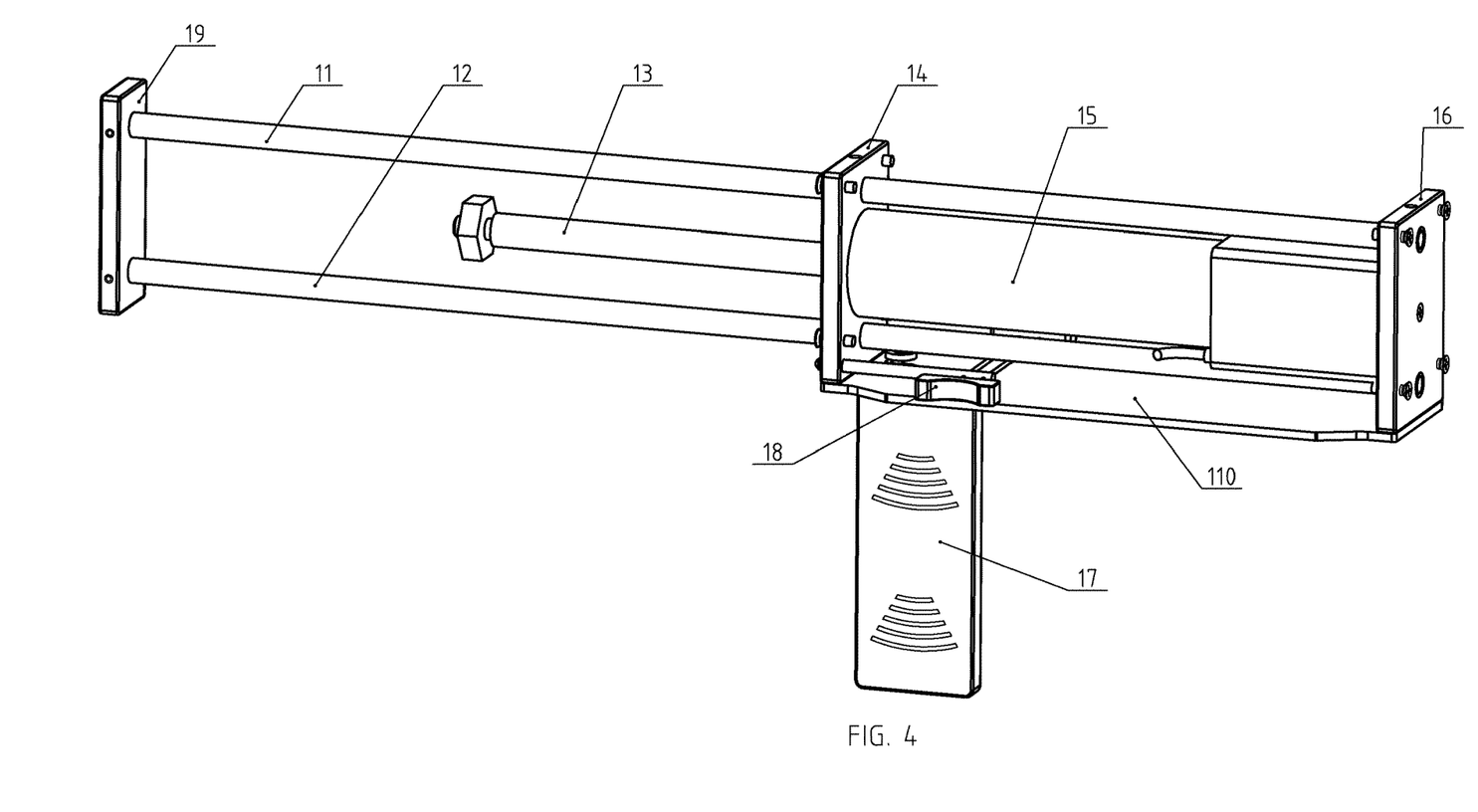
FIG. 4 is a 3d-drawing of a stationary portion of FIG. 1, wherein a shell and an electric control part are removed.

Referring to FIG. 4, said stationary portion 1 comprises said first stationary shaft 11, said second stationary shaft 12 parallel to said first stationary shaft 11, said movable shaft 13 parallel to said first stationary shaft 11, a first stationary plate 14 perpendicular to and fixedly connected to said first and second stationary shaft 11,12, a second stationary plate 16 perpendicular to and fixedly connected to said first and second stationary shaft 11,12, said hydraulic cylinder driving unit 15 arranged between said first and second stationary plate 14,16, a third stationary plate 19 perpendicular to and fixedly connected to said first and second stationary shaft 11,12, a fourth stationary plate 110 perpendicular to and fixedly connected to said first and second stationary plate 14,16, a first positioning pillar 111 arranged to said fourth stationary plate 110 for inserting into a positioning hole of a busbar, a first heating portion 17 arranged to said fourth stationary plate 110 for heating said first busbar, and a supporting portion 18 for supporting a loading portion 3. Said movable shaft 13 is fixedly connected to a piston rod of said hydraulic cylinder driving unit 15, which drives said movable shaft 13 to move between said first stationary plate 14 and said third stationary plate 19 under control of said electric control unit 21. Said first heating portion 17 is movably connected to said fourth stationary plate 110 to adjust a distance between said first heating portion 17 and said first busbar, said first heating portion 17 heats said first busbar under control of said electric control unit, heating manner is a high frequency alternative magnetic heating. A supporting end of said supporting portion 18 penetrates through a first stationary plate 14, a length of said supporting end protruding from said first stationary plate 14 is adjusted by a sliding block of said supporting portion 18. Said loading portion 3 comprises two movable plates which respectively open or close with respect to an axis of said second stationary shaft 12, said movable plate comprises a receiving cavity for receiving connecting rods and a magnetic element for keeping said loading portion 3 at a close status, a distance between each receiving cavity is identical to a distance between holes preprocessed to busbars. A connecting rod is clamped tightly by two movable plates when said loading portion 3 is at close stat, there is no relative displacement between said connecting rod and said movable plates.

Figure 5:
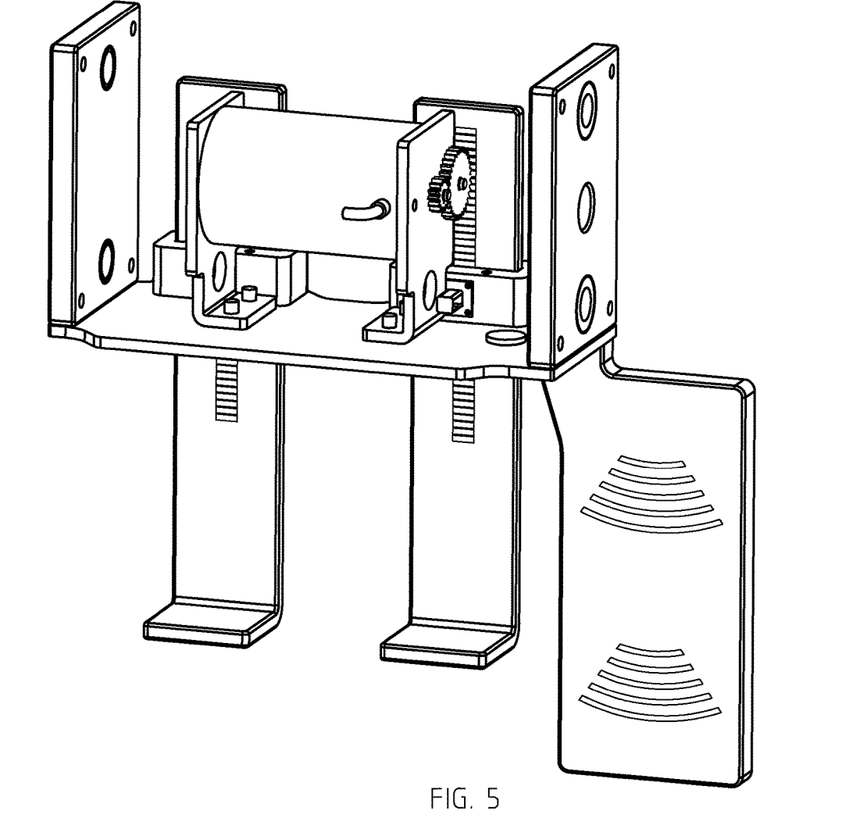
FIG. 5 is a 3d-drawing of a movable portion of FIG. 1, wherein a shell and an electric control part are removed.
Figure 11:
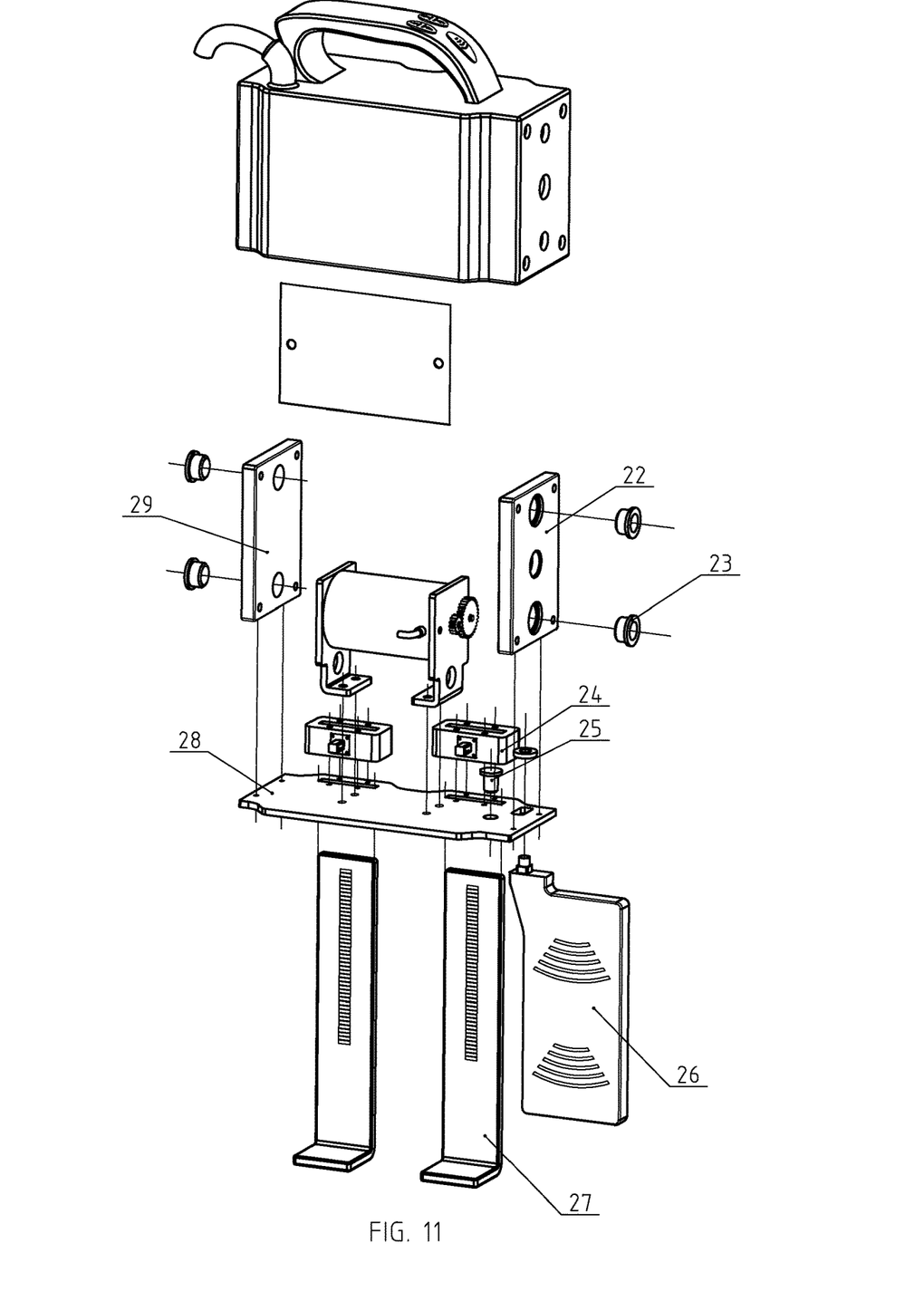
FIG. 11 is an exploded 3d-drawing of a movable portion of the invention.

Referring to FIG. 5 and FIG. 11, said movable portion 2 comprises a seventh stationary plate 28, a fifth stationary plate 22 perpendicular to and fixedly connected to said seventh stationary plate 28, a sixth stationary plate 29 perpendicular to and fixedly connected to said seventh stationary plate 28, a second positioning pillar 25 arranged to said seventh stationary plate 28 for inserting into a positioning hole of said second busbar, a clamping portion 27 for clamping said second busbar arranged between said fifth and sixth stationary plate 22,29 and through said seventh stationary plate 28, an electric motor driving unit arranged to said seventh stationary plate 28 for driving said clamping portion 27 to move, a limiting portion 24 arranged to said seventh stationary plate 28 for limiting said clamping portion 24 to move, and a second heating portion 26 arranged to said seventh stationary plate 28 for heating said second busbar. Said electric motor driving unit is connected to said electric control unit, a gear of said electric motor driving unit meshes with a teeth groove arranged to said clamping portion 27. Said second heating portion 26 is movably connected to said seventh stationary plate 28 to adjust a distance between said second heating portion 26 and said second busbar, said second heating portion 26 heats said second busbar under control of said electric control unit, heating manner is a high frequency alternative magnetic heating. Said fifth stationary plate 22 is parallel to said sixth stationary plate 29, said fifth stationary plate 22 comprises a sleeve 23, which has an interference fit with said fifth stationary plate 22 and a clearance fit with said first and second stationary shaft 11,12. Said sixth stationary plate 29 comprises a sleeve 23, which has an interference fit with said fifth stationary plate 22 and a clearance fit with said first and second stationary shaft 11,12. Said electric control unit is arranged to an inner side of a shell of said movable portion 2, said electric control unit is electrically connected with buttons of a handle, an electric motor driving unit, a limiting portion 24, said second heating portion 26. Said second heating portion 26 works for a certain period of time after activating a heating button of a handle. Activating a clamping button of a handle, firstly, said limiting portion 24 releases a meshing relationship with a teeth groove arranged to said clamping portion 27, that is to say that a limiting effect on said clamping portion 27 from said limiting portion 24 is released, secondly, said electric motor driving unit works, said clamping portion 27 clamping said second busbar is achieved by a meshing between motor gears and said teeth groove arranged to said clamping portion 27. Stop activating said clamping button, said limiting portion 24 rebuilds a meshing relationship with said teeth groove arranged to said clamping portion 27, that is to say that a limiting effect on said clamping portion 27 from said limiting portion 24 works, said clamping portion 27 is unmovable to keep a status of clamping said second busbar. Activating a releasing button of a handle, firstly, said limiting portion 24 releases a meshing relationship with a teeth groove arranged to said clamping portion 27, that is to say that a limiting effect on said clamping portion 27 from said limiting portion 24 is released, secondly, said electric motor driving unit works, said clamping portion 27 releasing said second busbar is achieved by a meshing between motor gears and said teeth groove arranged to said clamping portion 27. Stop activating said releasing button, said limiting portion 24 rebuilds a meshing relationship with said teeth groove arranged to said clamping portion 27, that is to say that a limiting effect on said clamping portion 27 from said limiting portion 24 works, said clamping portion 27 is unmovable to keep a status or releasing said second busbar.

Figure 3:
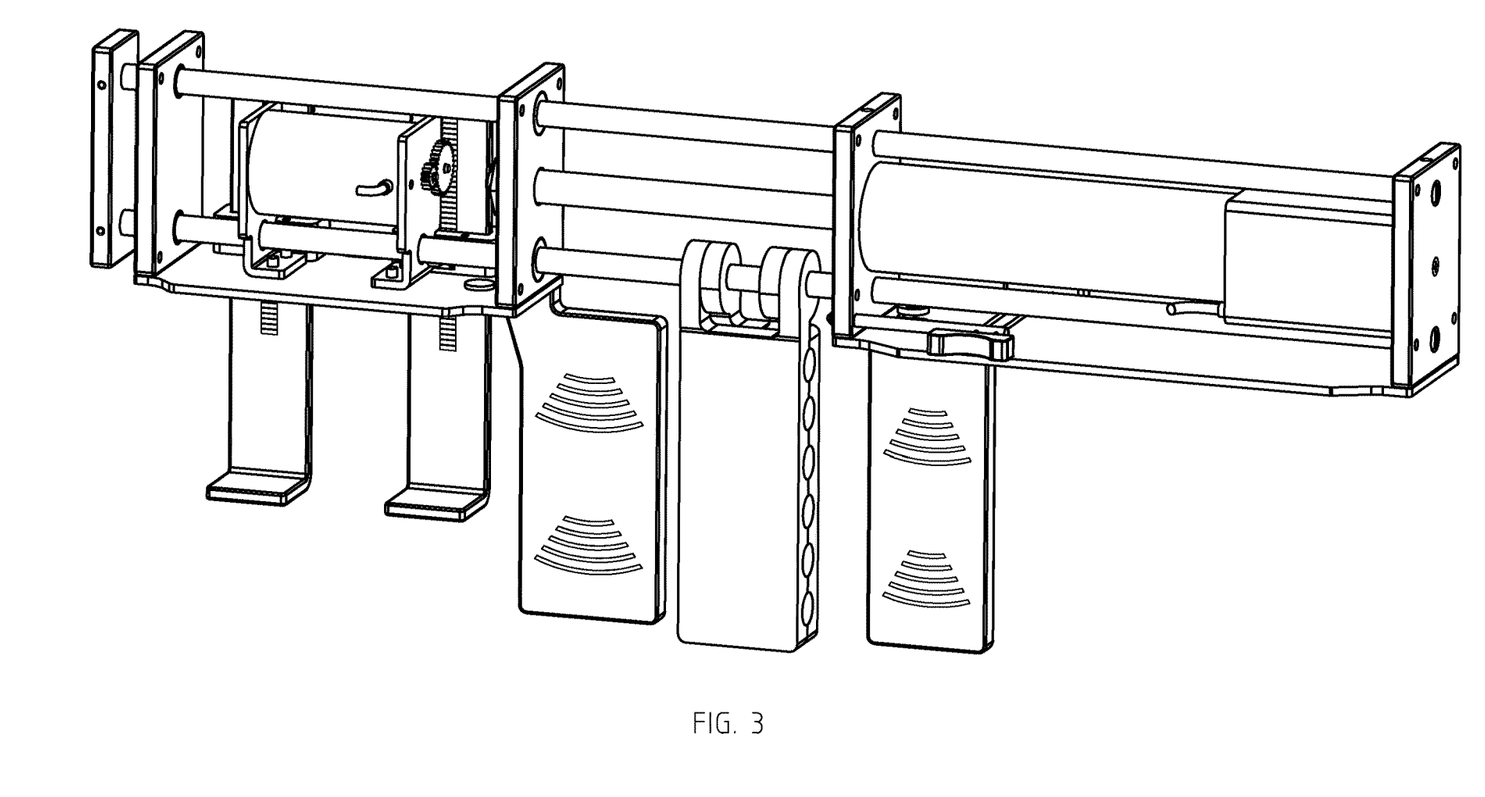
FIG. 3 is a 3d-drawing of FIG. 1, wherein a shell and an electric control part are removed.

Referring to FIG. 3, said first and second stationary shaft 11,12 of said stationary portion 1 penetrate through said movable portion 2, an end of said movable shaft 13 of said stationary portion 1 is fixedly connected to said fifth stationary plate 22 of said movable portion 2 by a nut, said movable portion 2 slides between said third and first stationary plate 19,14 of said stationary portion 1, said second stationary shaft 12 of said stationary portion 1 penetrates through said loading portion 3, which slides between said fifth stationary plate 22 of said movable portion 2 and said first stationary plate 14 of said stationary portion 1. Said first stationary shaft 11 has a clearance fit with a sleeve 23 arranged to said fifth and sixth stationary plate 22,29 of said movable portion 2, said second stationary shaft 12 has a clearance fit with a sleeve 23 arranged to said fifth and sixth stationary plate 22,29 of said movable portion 2, said movable portion 2 only has one axial freedom with respect to said stationary portion 1 because of an arrangement of said first and second stationary shaft 11,12, that is to say that said movable portion 2 only slides axially to be good for busbars connecting correctly.

Figure 8:
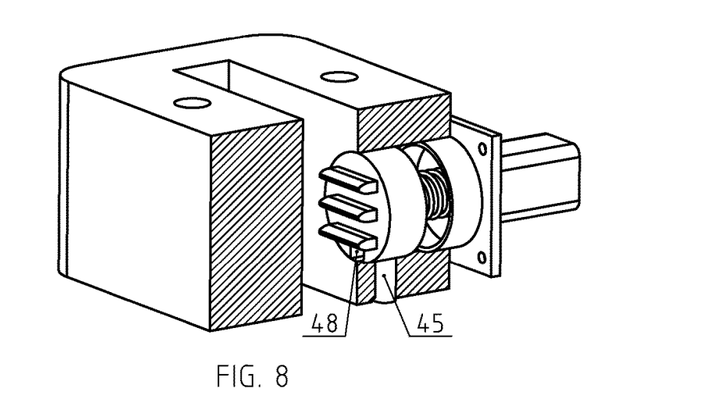
FIG. 8 is a sectional 3d-drawing of a limiting portion of the invention, wherein a tooth is at a meshing status.
Figure 9:
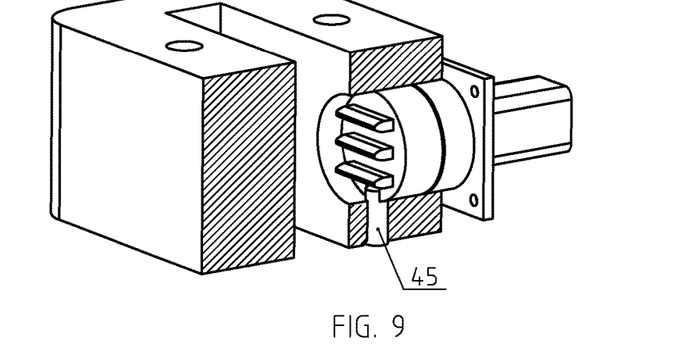
FIG. 9 is a sectional 3d-drawing of a limiting portion of the invention, wherein a tooth is not at a meshing status.
Figure 10:
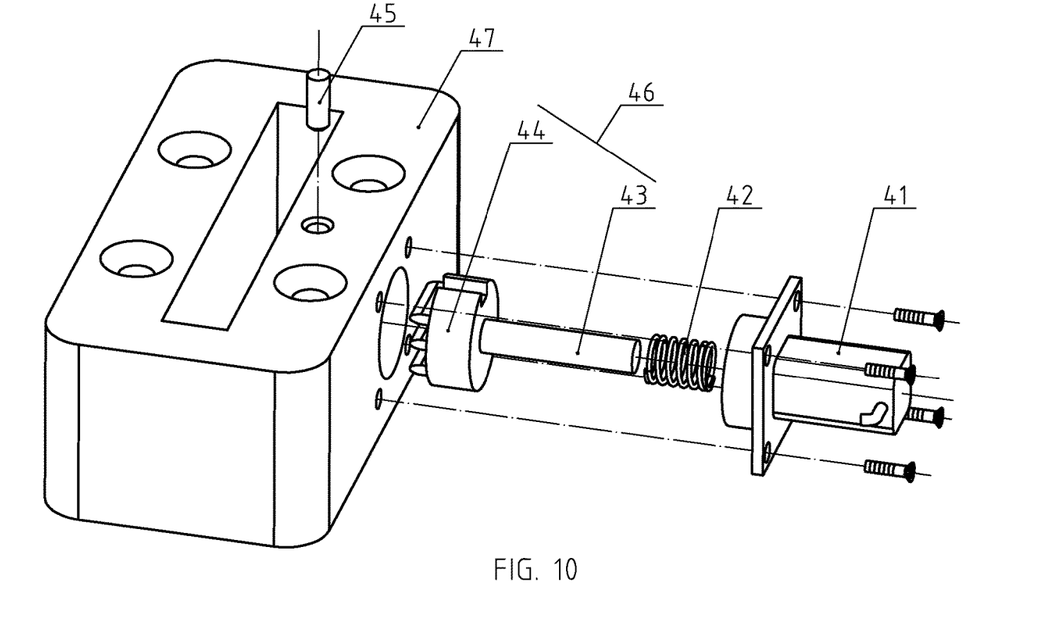
FIG. 10 is an exploded 3d-drawing of a limiting portion of the invention.

Referring to FIG. 8 to FIG. 10, said limiting portion 24 comprises a base 47, a straight pin 45 which has an interference fit with said base 47, a limiting end 46 for partly inserting into said base 47, a spring 42 for replacing said limiting end 46 and an electromagnet 41 for matching with a core rod 43 of said limiting end 46. Said electromagnet 41 is fastened to said base 47 by screws, said limiting end 46 comprises a tooth 44 meshing with a teeth groove of said clamping portion 27, said tooth 44 comprises a recess 48 matching with said straight pin 45, said electromagnet 41 attracts said core rod 43 of said limiting end 46 not to mesh with said teeth groove of said clamping portion 27, said spring 42 acts on said tooth 44 to make said tooth 44 mesh with said teeth groove. A matching between a recess arranged to said tooth 44 and a straight pin 45 is good for a correct meshing between said tooth 44 and said teeth groove. Said limiting end 46 limits a movement of said clamping portion 27 when said tooth 44 meshes with said teeth groove, said limiting end 46 does not limit a movement of said clamping portion 27 when said tooth 44 does not mesh with said teeth groove, said clamping portion 27 moves with said electric motor driving unit.

Figure 6:
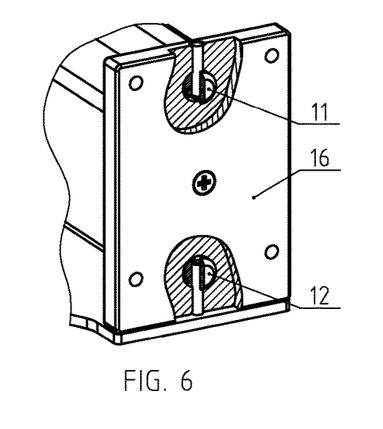
FIG. 6 is a sectional 3d-drawing of a stationary portion of FIG. 1.

Said first stationary shaft 11 is fixedly connected to said first stationary plate 14 by a straight pin 45, said second stationary shaft 12 is fixedly connected to said first stationary plate 14 by a straight pin 45, said first stationary shaft 11 is fixedly connected to said second stationary plate 16 by a straight pin 45, said second stationary shaft 12 is fixedly connected to said second stationary plate 16 by a straight pin 45, see FIG. 6.

Figure 7:
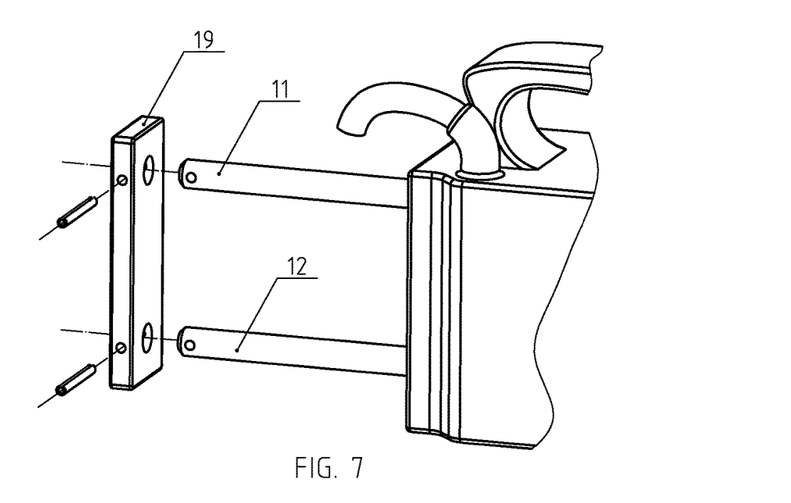
FIG. 7 is an exploded 3d-drawing of a tool of the invention.

Referring to FIG. 7, said first stationary shaft 11 is fixedly connected to said third stationary plate 19 by a straight pin 45, said second stationary shaft 12 is fixedly connected to said third stationary plate 19 by a straight pin 45. Ends of said first and second shaft 11,12 are fixedly connected by said third stationary plate 19 to increase rigidity of said stationary portion 1, such arrangement is good for said movable portion 2 to slide smooth along said first and second stationary shaft 11,12.

Process of busbars connecting is described as follows.

Figure 12:
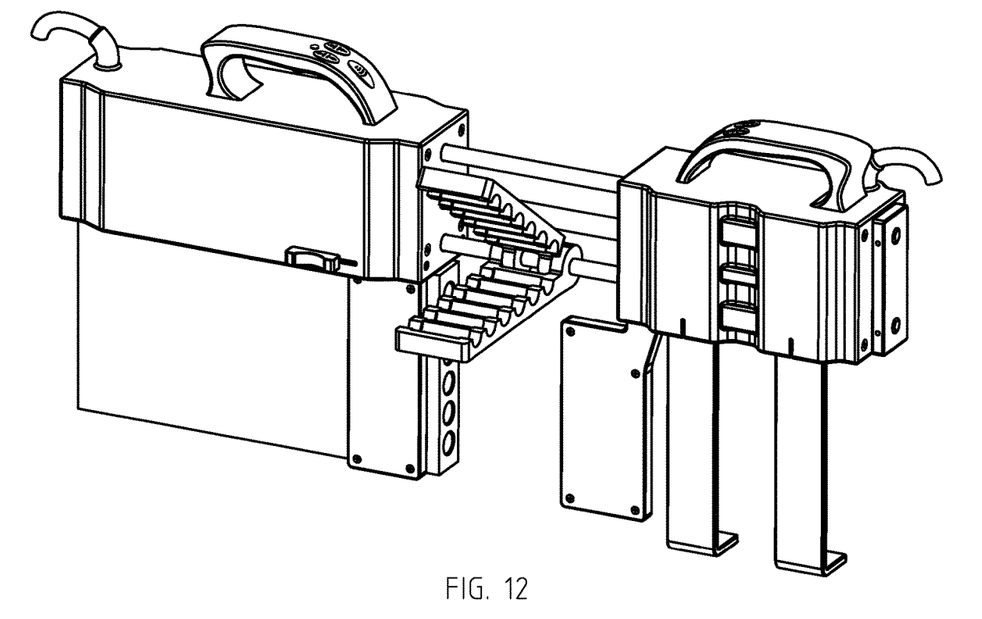
FIG. 12-20 are drawings of connecting steps using a tool of embodiment 1.

Referring to FIG. 12, inserting said first positioning pillar 111 of said stationary portion 1 into a positioning hole preprocessed to said first busbar is to make said fourth stationary plate 110 of said stationary portion 1 fit with said first busbar. Sliding movable portion 1 to a first position where said movable portion 2 fits with said third stationary plate 19 of said stationary portion 1. Simultaneously activating relative buttons of two handles is to make said clamping portion 27 of said movable portion 2 move to a position to clamp said second busbar. Rotating said loading portion 3 to a position where is convenient to load connecting rods and keep said loading portion 3 at an open status.

Figure 13:
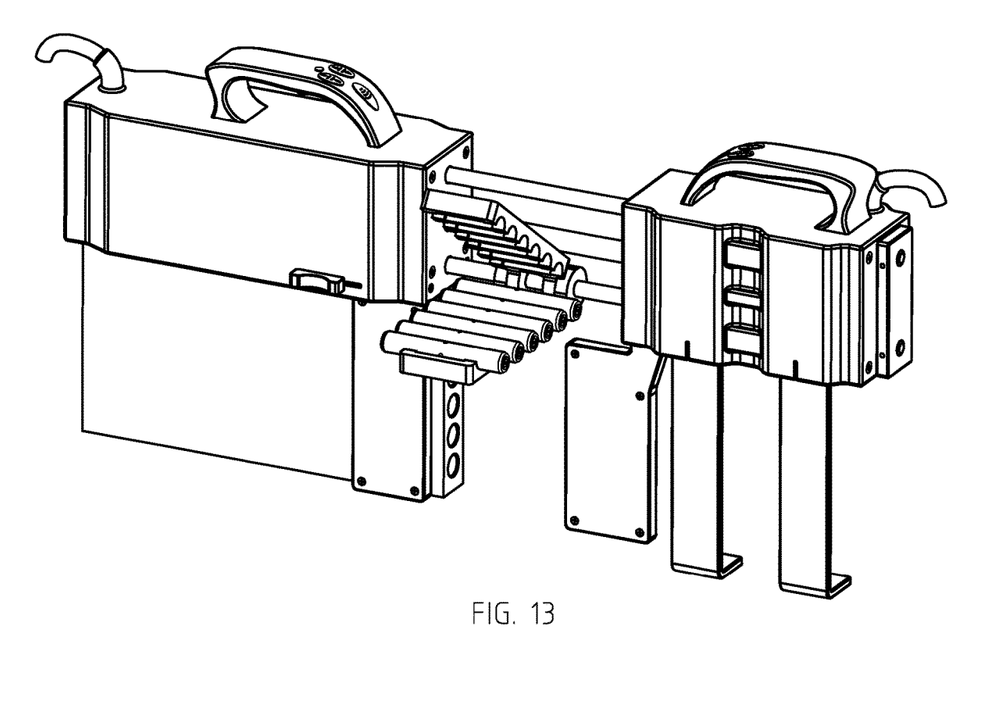

Referring to FIG. 13, centrally placing connecting rods into said receiving cavity of said loading portion 3.

Figure 14:
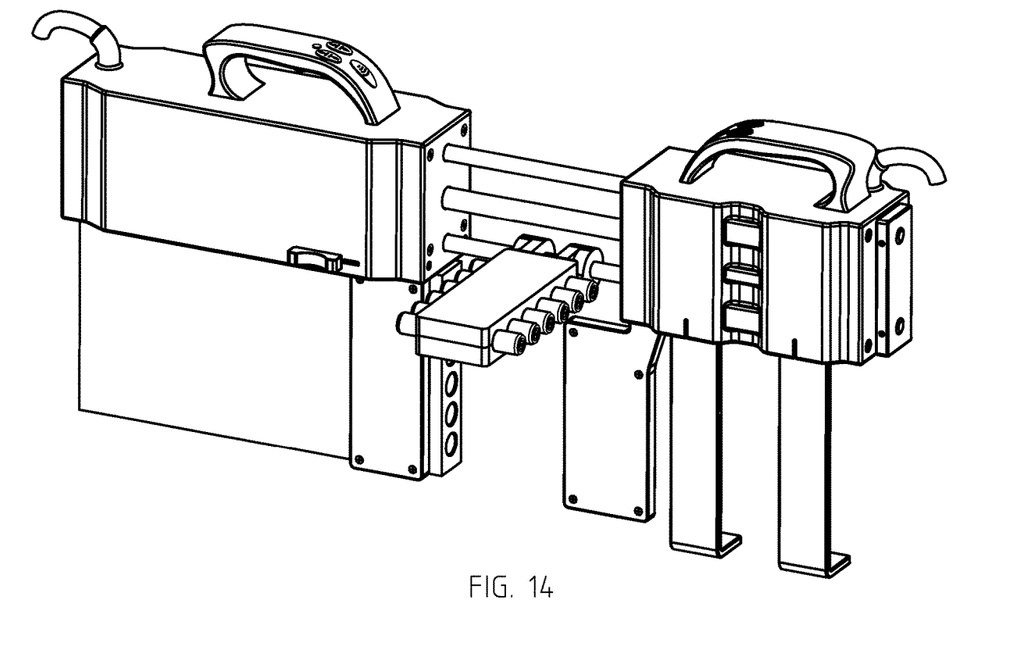

Referring to FIG. 14, closing said movable plates of said loading portion 3, said loading portion 3 keeps at a close status because of a magnetic element arranged to said movable plates.

Figure 15:
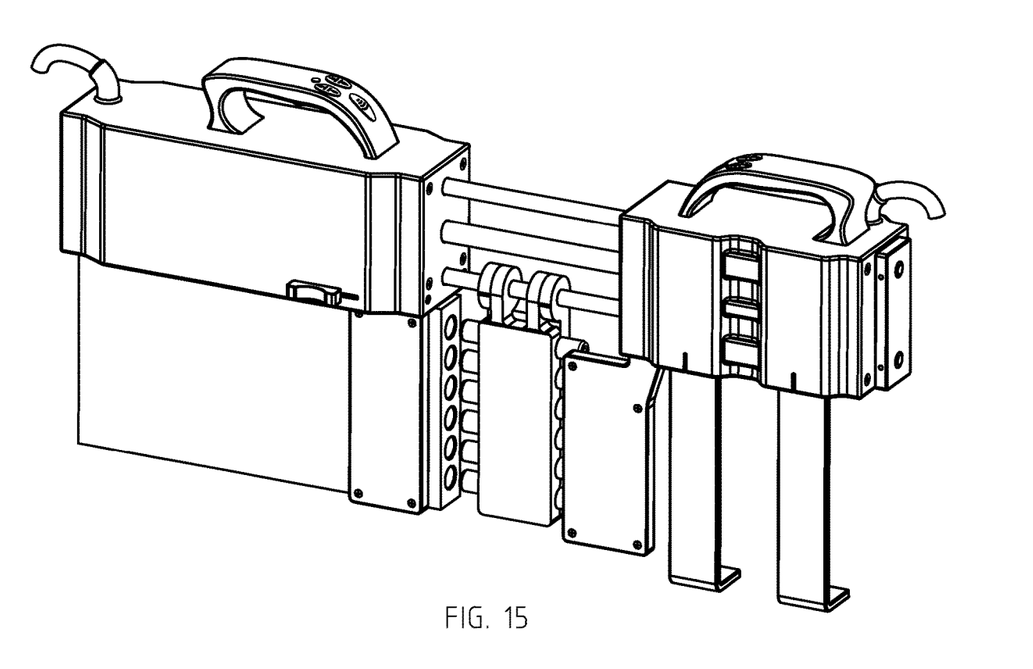

Referring to FIG. 15, rotating said loading portion 3 with connecting rods already mounted is to align connecting rods with preprocessed holes of said first busbar.

Figure 16:
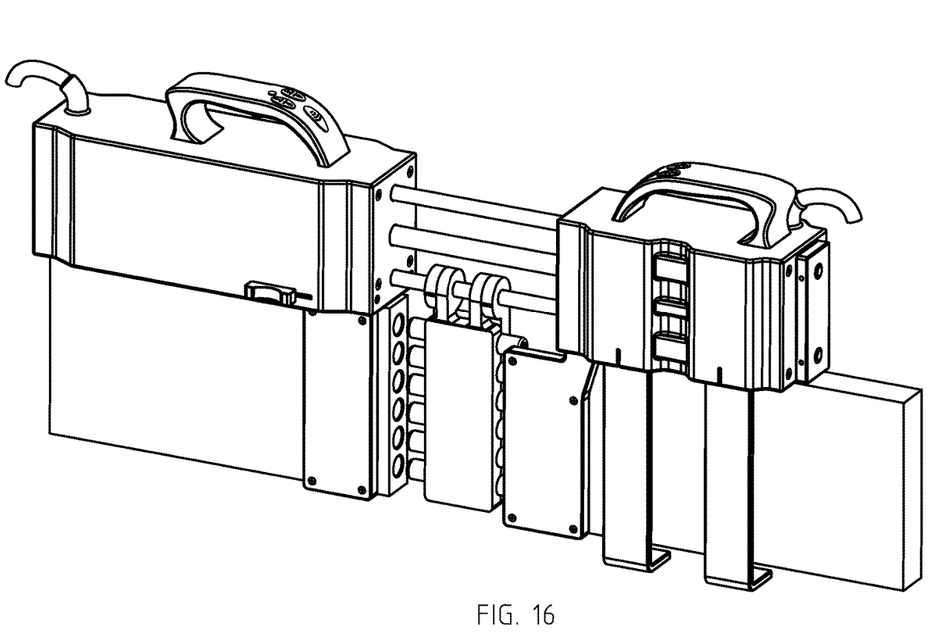

Referring to FIG. 16, inserting said second positioning pillar 25 of said movable portion 2 into a positioning hole preprocessed to said second busbar is to make said seventh stationary plate 28 of said movable portion 2 fit with said second busbar.

Figure 17:
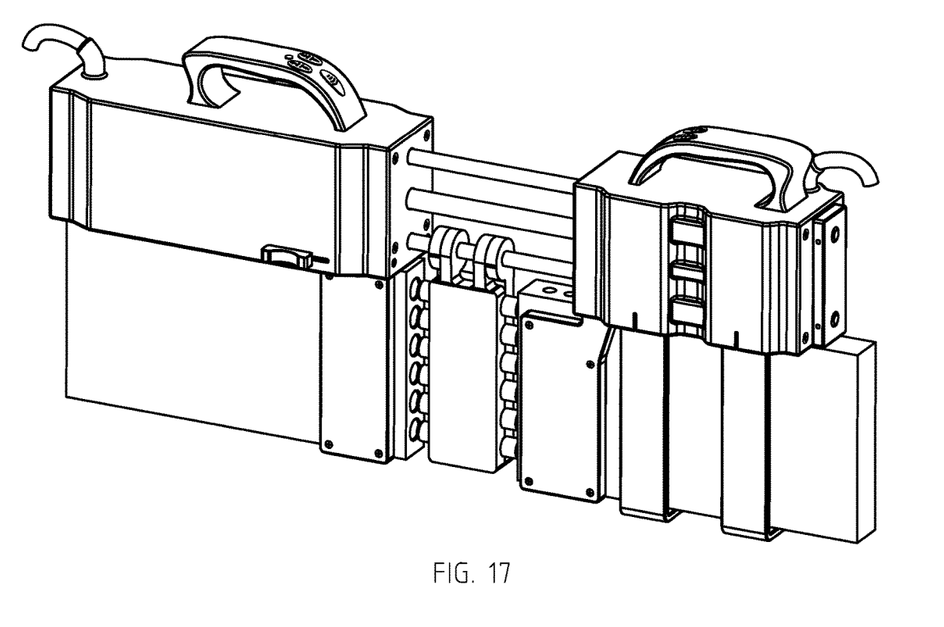

Referring to FIG. 17, simultaneously activating relative buttons of two handles is to make said clamping portion 27 of said movable portion 2 clamp said second busbar, adjusting positions of said first and second heating portion 17,26 is to make heating surfaces fit with busbars. Simultaneously activating relative buttons of two handles is to make said first and second heating portion 17,26 simultaneously heat said busbar with a certain period of time.

Figure 18:
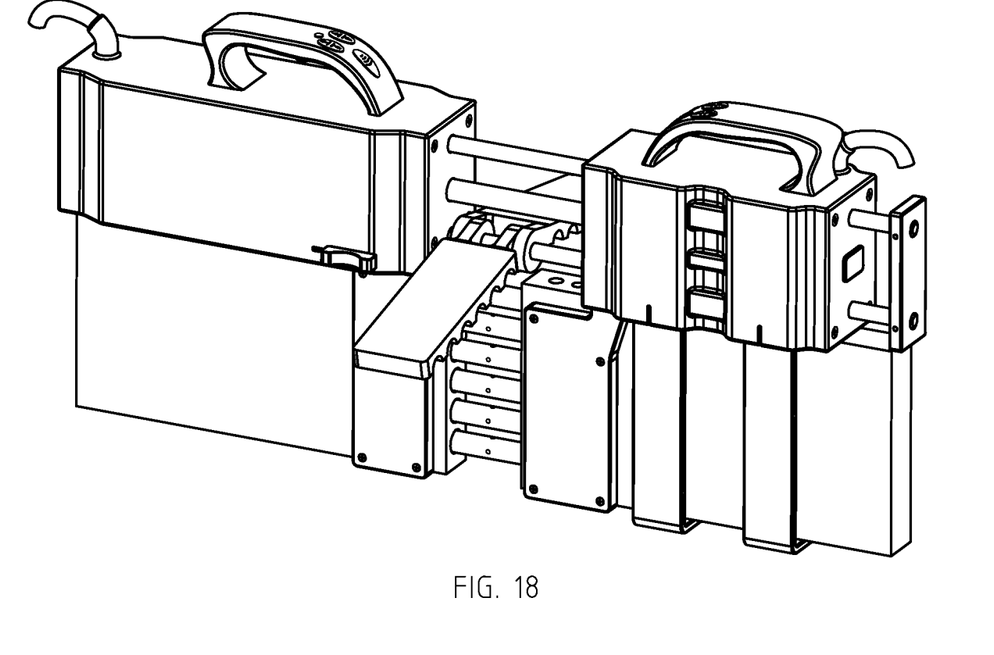

Referring to FIG. 18, after heating process, a diameter of said preprocessed hole of a busbar of said busbars is greater than a diameter of said connecting rod because of a heat expansion and contraction so that said connecting rods are convenient to mount to said preprocessed holes. Simultaneously activating relative buttons of two handles is to make said hydraulic cylinder driving unit 15 work, said movable portion 2 moves from a first position to a second position. After said connecting rods are partly inserting into said first and second busbars, pushing said sliding block of said supporting portion 18 of said stationary portion 1 is to make said supporting end protrude from said stationary portion 1, said loading portion 3 is kept at an open status to avoid said first and second busbars sticking said loading portion 3 when connecting busbars.

Figure 19:
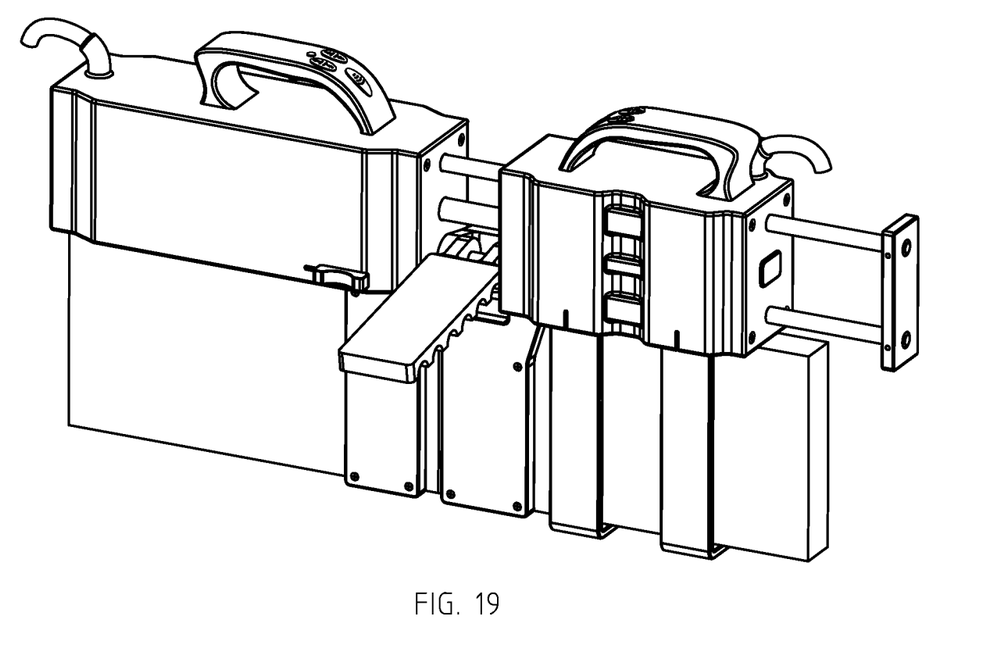

Referring to FIG. 19, continue activating relative buttons until said first and second busbars are totally fit with each other, that is to say that relative buttons are stopped activating when said movable portion 2 is at said second position.

Figure 20:
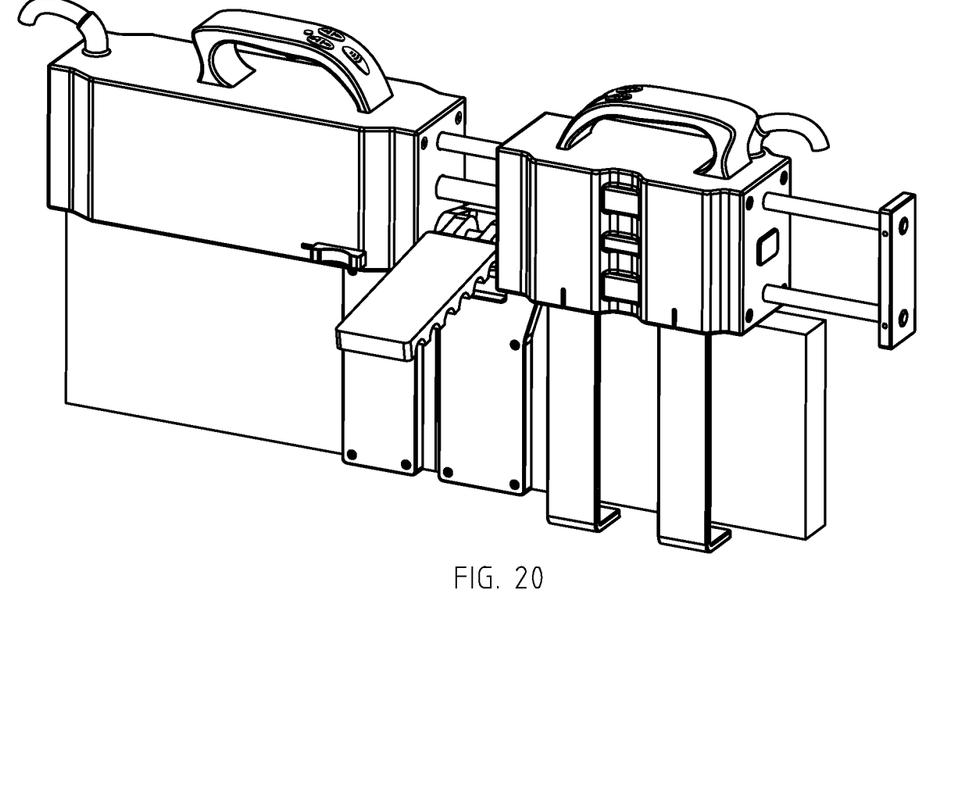

Referring to FIG. 20, simultaneously activating relative buttons of two handles is to make said clamping portion 27 release said second busbar after busbars are cooled. Removing a tool used for connecting busbars after mounting said connecting rods and connecting busbars successfully.

Embodiment 2

Hydraulic cylinder driving unit 15 in embodiment 1 is replaced by a pneumatic cylinder driving unit, a compressing air releasing unit is arranged to cool busbars after heating, air is used for said pneumatic cylinder driving unit and said compressing air releasing unit is supplied through an air input 5.

Figure 22:
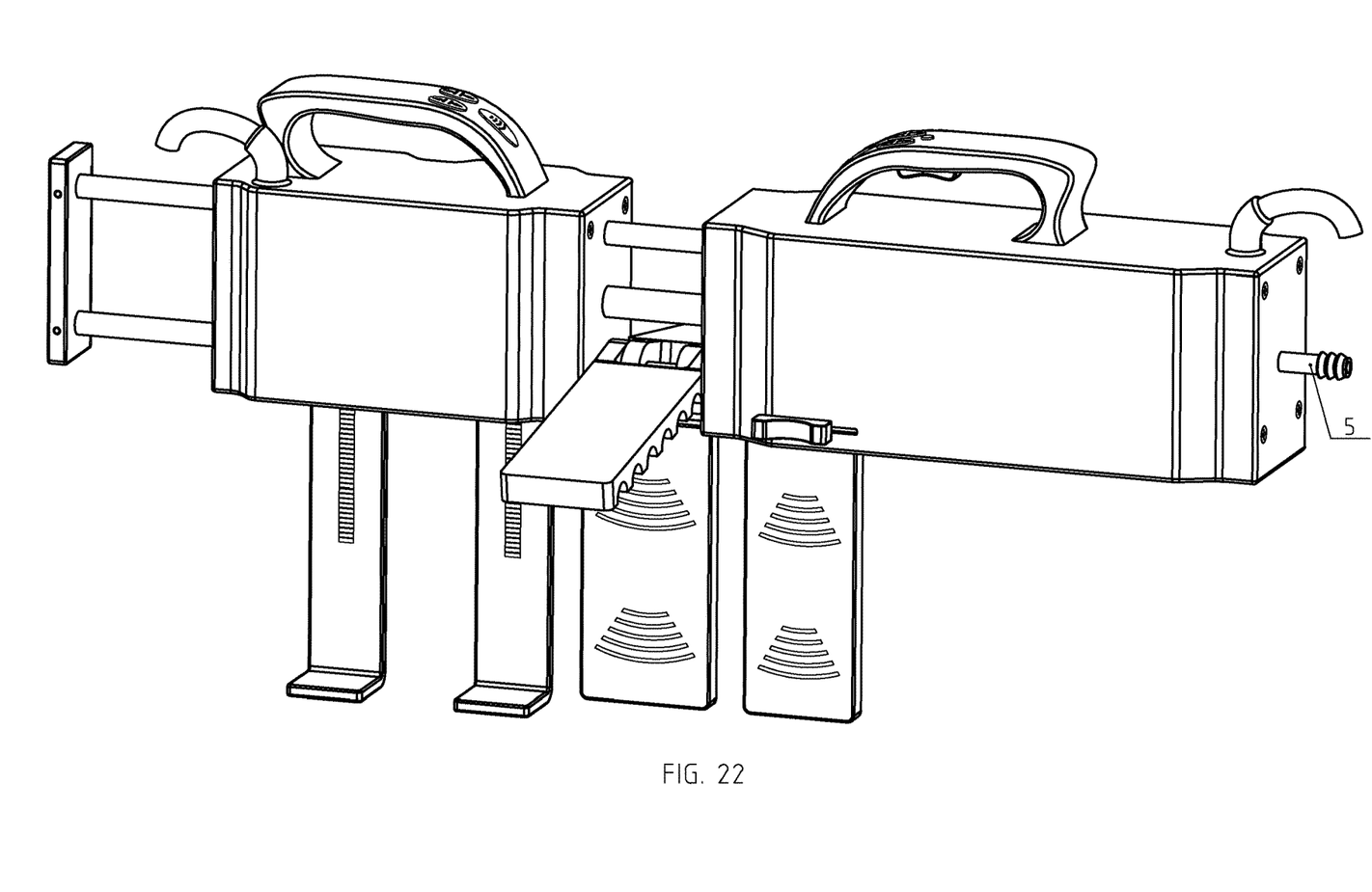
FIG. 22 is a 3d-drawing of a tool used for connecting busbars of embodiment 2.

Referring to FIG. 22, a tool used for connecting busbars comprises a stationary portion 1 removably connected to a first busbar, a movable portion 2 removably connected to a second busbar and a loading portion 3 for clamping connecting rods. Said movable portion 2 is movably connected to a first and second stationary shaft 11,12 of said stationary portion 1, said movable portion 2 is fixedly connected to said pneumatic cylinder driving unit of said stationary portion 1 by a movable shaft 13, said movable shaft 13 is driven to slide axially with respect to said first and second stationary shaft 11,12 by said pneumatic cylinder driving unit, said loading portion 3 is movably connected to said second stationary shaft 12 of said stationary portion 1 and slides between a body of said stationary portion 1 and a body of said movable portion 2. Said air input 5 is connected to an outer compressing air source.

The invention claimed is:

1. A tool for connecting busbars driven by a pneumatic cylinder driving unit comprising:
the pneumatic cylinder driving unit,
a stationary portion (1) removably connected to a first busbar,
a movable portion (2) removably connected to a second busbar, and
a loading portion (3) for clamping connecting rods;
the movable portion (2) being movably connected to a first and second stationary shaft (11,12) of the stationary portion (1), the movable portion (2) being fixedly connected to the pneumatic cylinder driving unit of the stationary portion (1) by a movable shaft (13), the movable shaft (13) being driven to slide axially with respect to the first and second stationary shaft (11,12) by the pneumatic cylinder driving unit, the loading portion (3) being movably connected to the second stationary shaft (12) of the stationary portion (1) and sliding between a stationary portion body and a movable portion body, the loading portion (3) rotating around the second stationary shaft (12);
wherein the stationary portion (1) includes:
a first stationary plate (14),
a second stationary plate (16),
a third stationary plate (19),
a fourth stationary plate (110), and
a first heating portion (17) arranged to the fourth stationary plate (110) for heating the first busbar;
the first heating portion (17) being movably connected to the fourth stationary plate (110) to adjust a distance between the first heating portion (17) and the first busbar;
wherein the movable portion (2) includes:
a fifth stationary plate (22),
a sixth stationary plate (29),
a seventh stationary plate (28), and
a second heating portion (26) arranged to the seventh stationary plate (28) for heating the second busbar;
the second heating portion (26) being movably connected to the seventh stationary plate (28) to adjust a distance between the second heating portion (26) and the second busbar.

2. The tool for connecting busbars driven by the pneumatic cylinder driving unit according to claim 1, wherein the stationary portion (1) includes:
the first stationary shaft (11),
the second stationary shaft (12) parallel to the first stationary shaft (11),
the movable shaft (13) parallel to the first stationary shaft (11),
the first stationary plate (14) perpendicular to and fixedly connected to first and second stationary shaft (11,12),
the second stationary plate (16) perpendicular to and fixedly connected to the first and second stationary shaft (11,12),
the pneumatic cylinder driving unit arranged between the first and second stationary plate (14,16),
the third stationary plate (19) perpendicular to and fixedly connected to the first and second stationary shaft (11, 12),
the fourth stationary plate (110) perpendicular to and fixedly connected to the first and second stationary plate (14,16), and
a first positioning pillar (111) arranged to the fourth stationary plate (110) for inserting into a positioning hole of the first busbar;
the movable shaft (13) being fixedly connected to a piston rod of the pneumatic cylinder driving unit, the piston rod driving the movable shaft (13) to move between the first stationary plate (14) and the third stationary plate (19);
wherein the movable portion (2) further includes:
the seventh stationary plate (28),
the fifth stationary plate (22) perpendicular to and fixedly connected to the seventh stationary plate (28),
the sixth stationary plate (29) perpendicular to and fixedly connected to the seventh stationary plate (28),
a second positioning pillar (25) arranged to the seventh stationary plate (28) for inserting into a positioning hole of the second busbar,
a clamping portion (27) for clamping the second busbar arranged between the fifth and sixth stationary plate (22,29) and through the seventh stationary plate (28),
an electric motor driving unit arranged to the seventh stationary plate (28) for driving the clamping portion (27) to move, and
a limiting portion (24) arranged to the seventh stationary plate (28) for limiting the clamping portion (24) to move;
the loading portion (3) further includes two movable plates which respectively open or close with respect to an axis of the second stationary shaft (12), wherein the movable plate includes a receiving cavity for receiving connecting rods; the first and second stationary shaft (11,12) of the stationary portion (1) penetrating through the movable portion (2), an end of the movable shaft (13) of the stationary portion (1) fixedly connected to the fifth stationary plate (22) of the movable portion (2), the movable portion (2) sliding between the third and first stationary plate (19,14) of the stationary portion (1), the second stationary shaft (12) of the stationary portion (1) penetrating through the loading portion (3), which slides between the fifth stationary plate (22) of the movable portion (2) and the first stationary plate (14) of the stationary portion (1) and rotates around the second stationary shaft (12), the fifth stationary plate (22) being parallel to the sixth stationary plate (29).

3. The tool for connecting busbars driven by the pneumatic cylinder driving unit according to claim 2, wherein the stationary portion (1) further comprises a supporting portion (18) for supporting the loading portion (3), a supporting end of the supporting portion (18) penetrating through a first stationary plate (14), a length of the supporting end protruding from the first stationary plate (14) being adjusted by a sliding block of the supporting portion (18).

4. The tool for connecting busbars driven by the pneumatic cylinder driving unit according to claim 2, wherein the limiting portion (24) includes:
a base (47),
a straight pin (45) which has an interference fit with the base (47),
a limiting end (46) for partly inserting into the base (47),
a spring (42) for replacing the limiting end (46), and
an electromagnet (41) for matching with a core rod (43) of the limiting end (46);
the electromagnet (41) being fastened to the base (47) by screws, wherein the limiting end (46) includes a tooth (44) meshing with a teeth groove of the clamping portion (27), wherein the tooth (44) includes a recess (48) matching with the straight pin (45), the electromagnet (41) attracting the core rod (43) of the limiting end (46) not to mesh with the teeth groove of the clamping portion (27), the spring (42) acting on the tooth (44) to make the tooth (44) mesh with the teeth groove.

* * * * *